C. T. BRENNAN & H. L. SMITH.
AUTOMATIC THREADER.
APPLICATION FILED SEPT. 17, 1915.
1,174,814.
Patented Mar. 7, 1916.
6 SHEETS—SHEET 3.
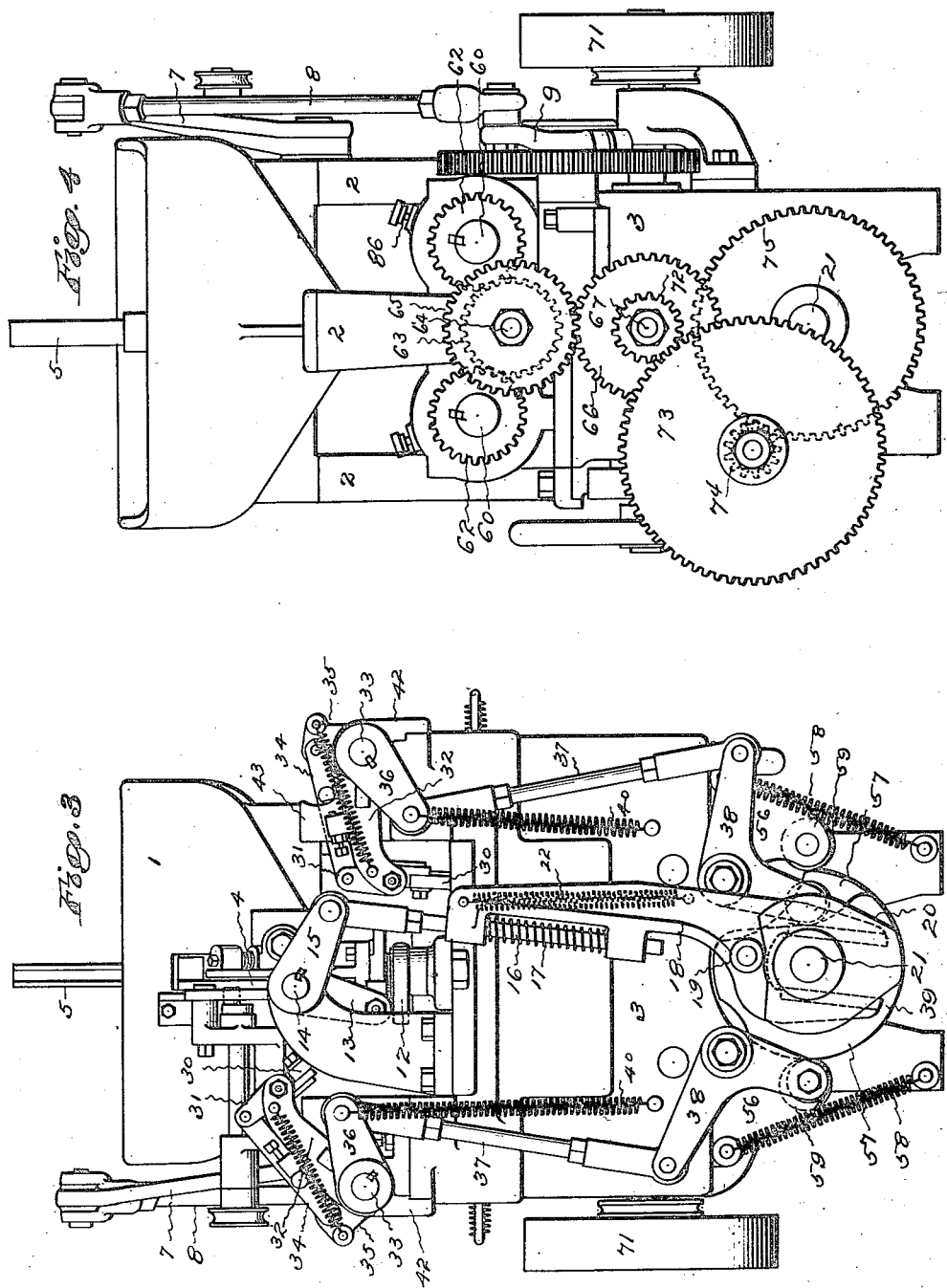

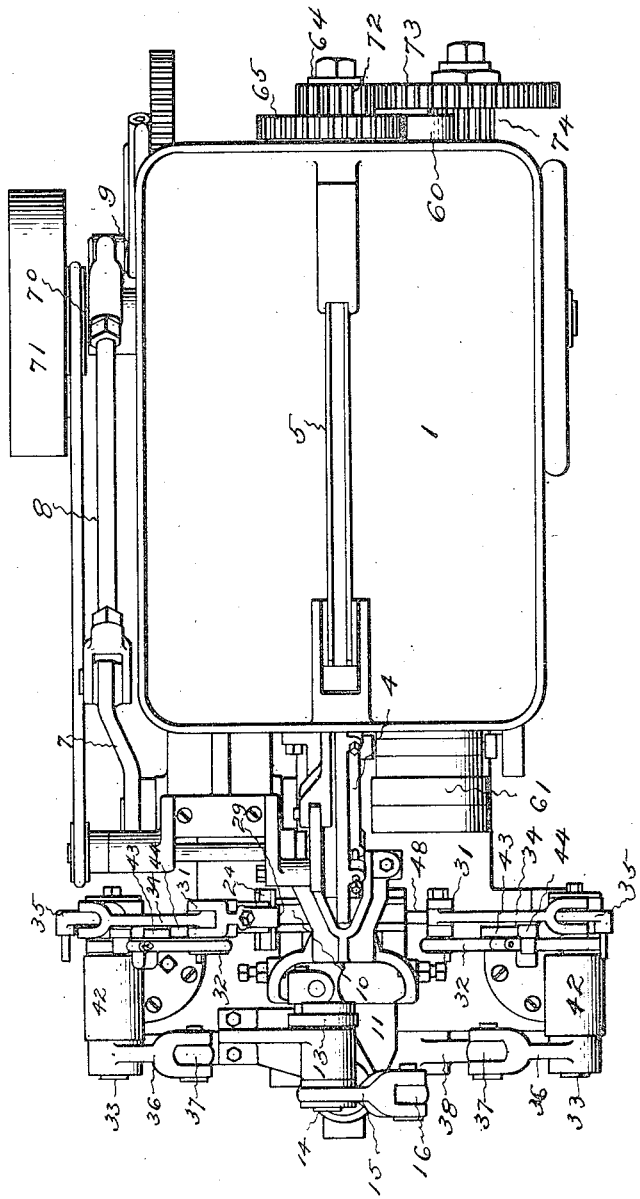

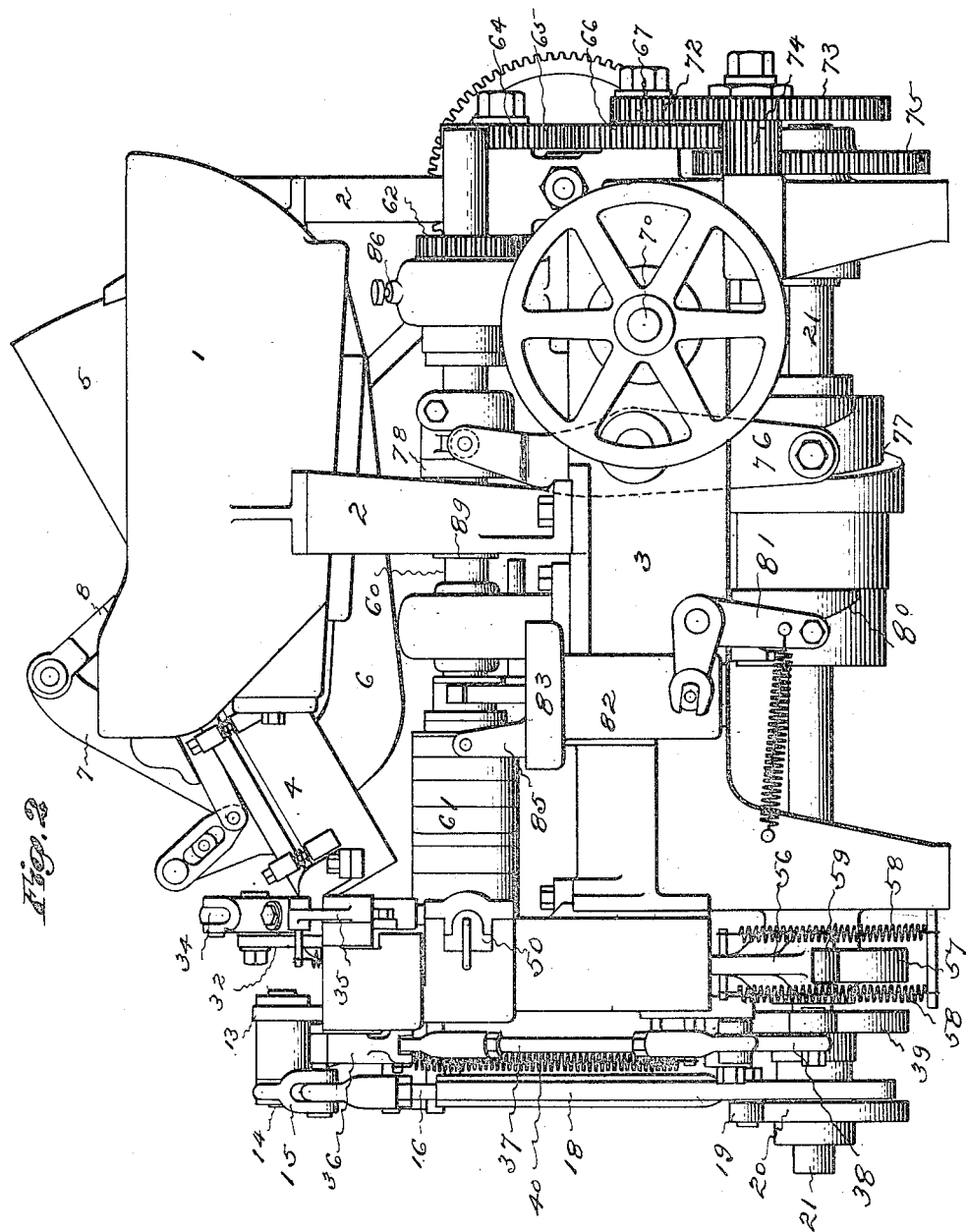

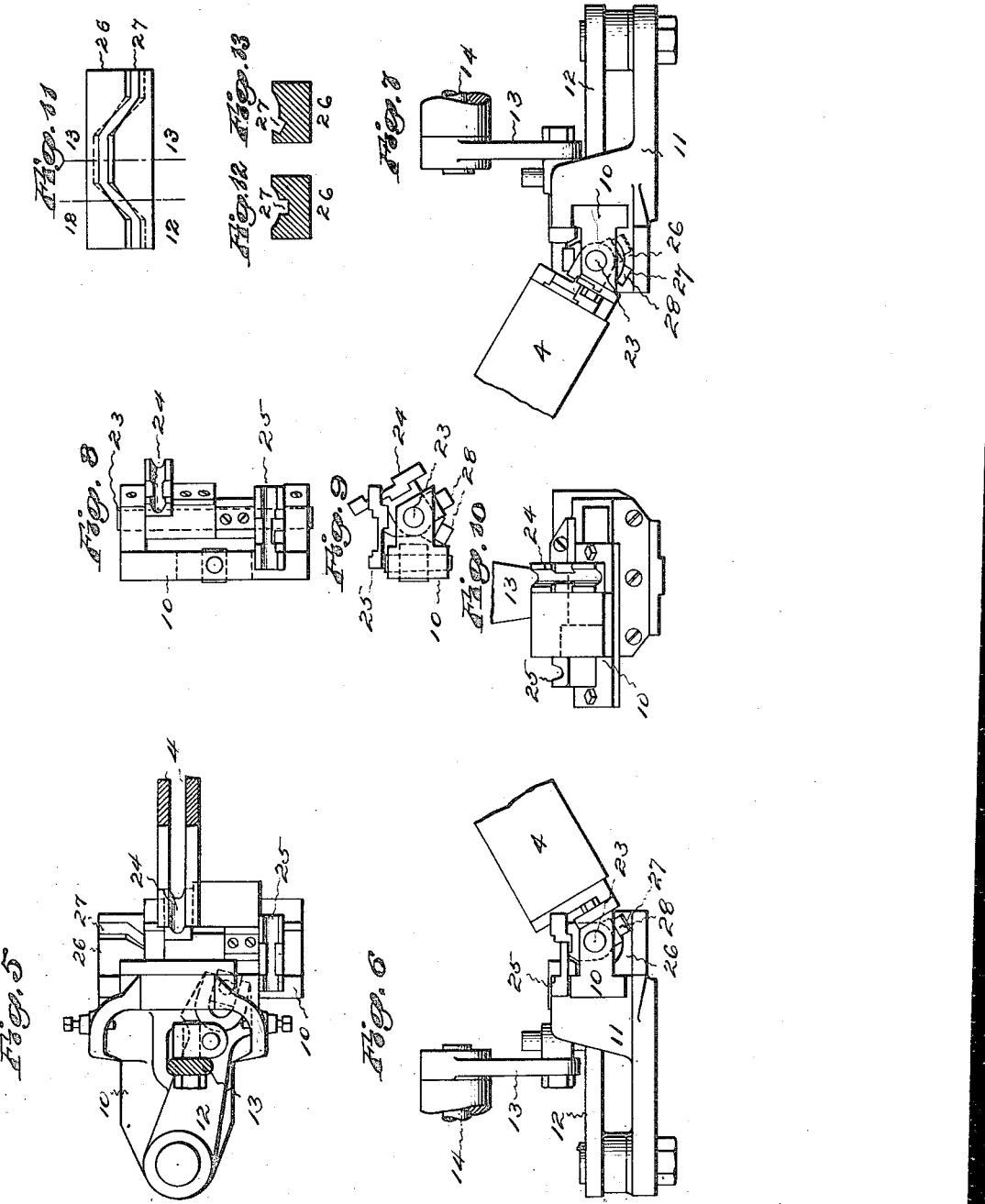

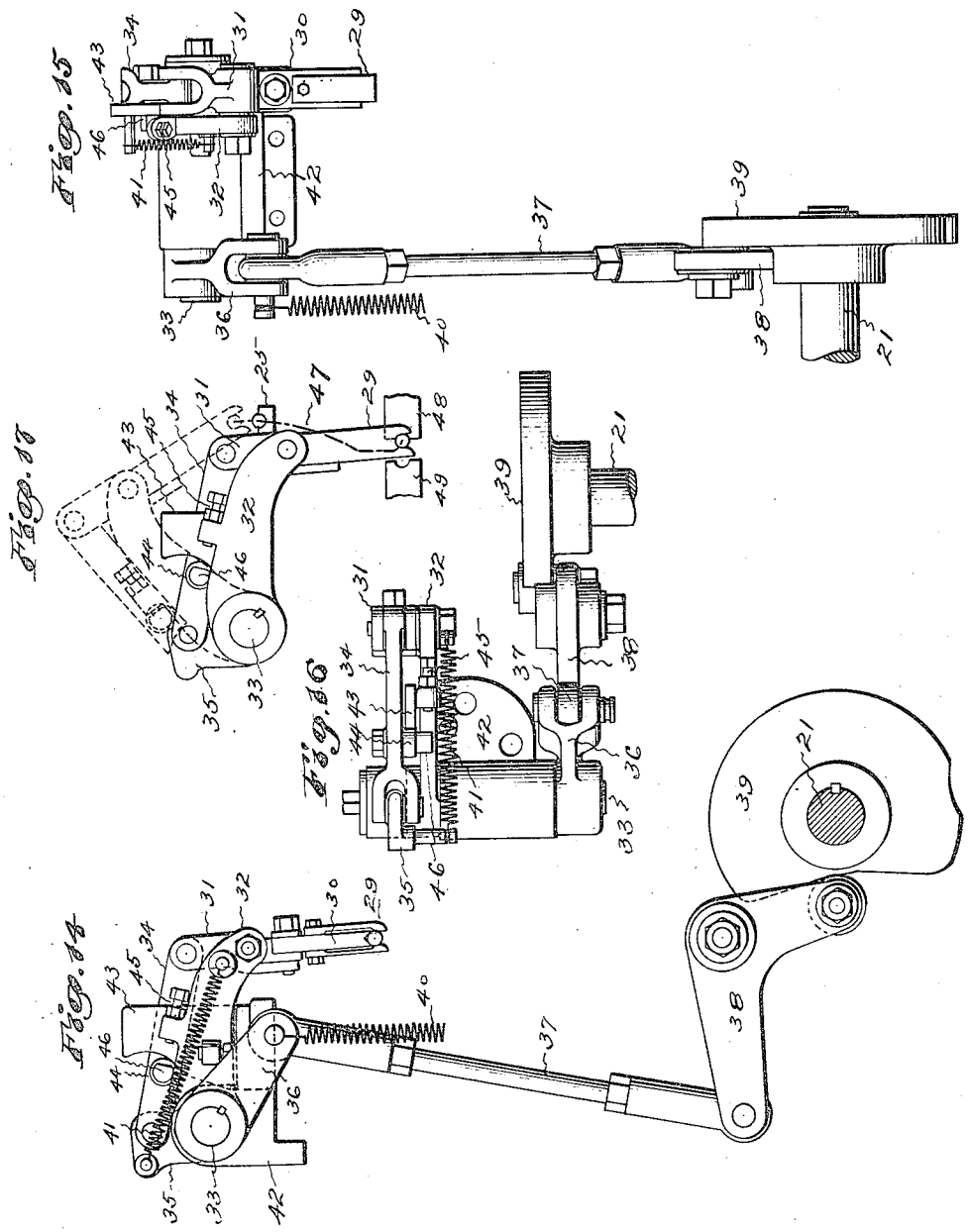

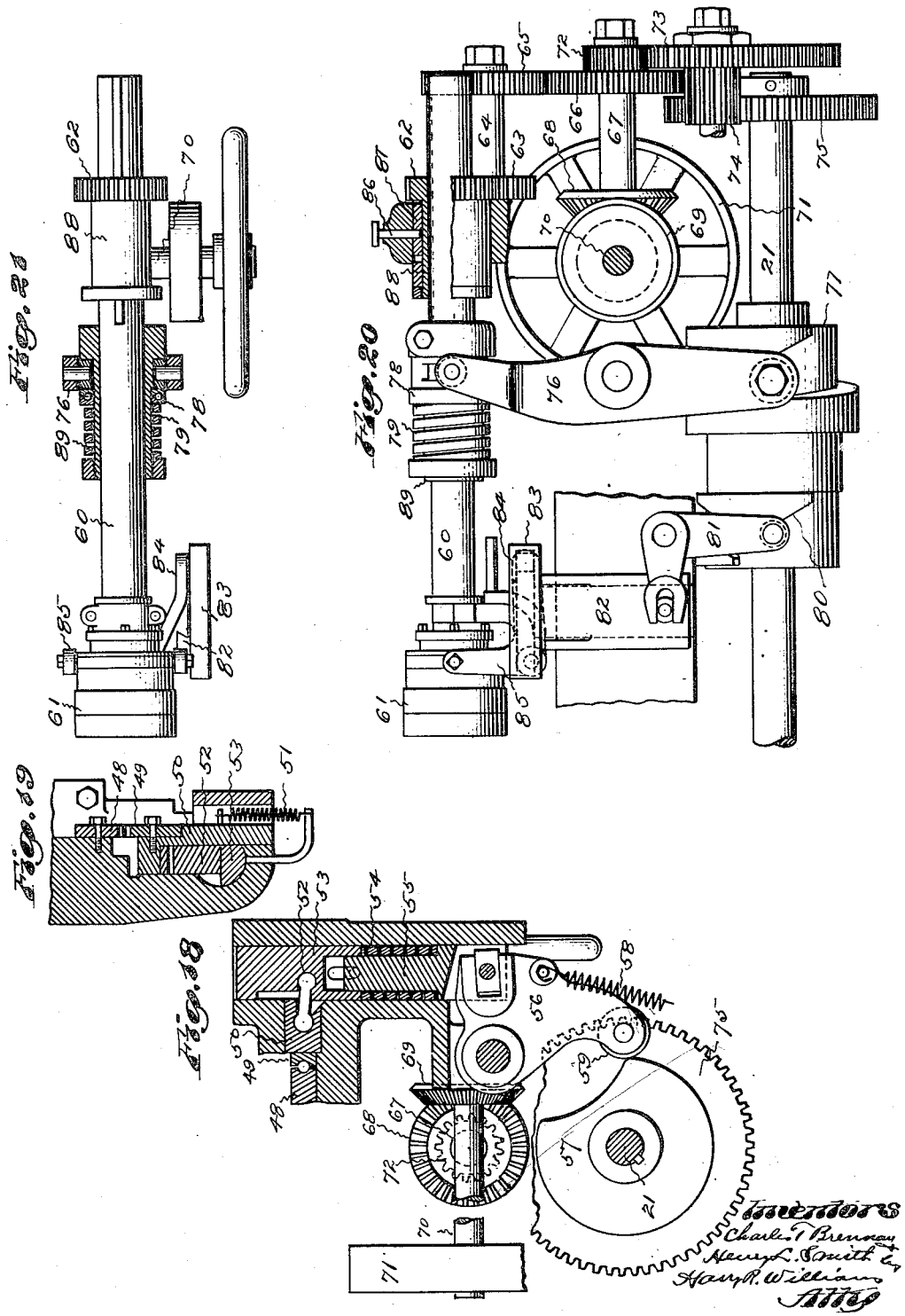

UNITED STATES PATENT OFFICE.

CHARLES T. BRENNAN AND HENRY L. SMITH, OF WATERBURY, CONNECTICUT, ASSIGNORS TO THE E. J. MANVILLE MACHINE COMPANY, OF WATERBURY, CONNECTICUT, A CORPORATION OF CONNECTICUT.

AUTOMATIC THREADER.

1,174,814.   Specification of Letters Patent.   Patented Mar. 7, 1916.

Application filed September 17, 1915. Serial No. 51,179.

*To all whom it may concern:*

Be it known that we, CHARLES T. BRENNAN and HENRY L. SMITH, citizens of the United States, residing at Waterbury, in the county of New Haven and State of Connecticut, have invented a new and useful Improvement in Automatic Threaders, of which the following is a specification.

This invention relates to an automatic feeding mechanism which is particularly adapted for machines for threading and pointing bolts, although the mechanism is applicable to other machines, such as bolt trimmers.

The object of the invention is to provide a simple and compact mechanism which will surely and rapidly transfer blanks of large size from a feed chute to the gripping jaws that hold the blanks in position to be operated upon by the cutting tools, and thereby increase the efficiency of machines of the class mentioned. To attain this end the mechanisms have been devised so as to receive the blanks from the feed chute down which they come from the hopper into which they have been promiscuously thrown, and carry alternate blanks one way and pick them up and transport them to holding jaws in line with cutting tools on one side of the machine, and carry the intermediate blanks the opposite way and pick them up and transport them to holding jaws in line with cutting tools on the other side of the machine; the carrier being so arranged that when in one position it presents a blank to transferring fingers on one side and receives a blank for transferring fingers on the other side, and when in its other position it presents the blank it has received to the fingers on the other side and receives a blank for the first mentioned fingers; and the transporting mechanisms being so timed that when the fingers on one side are taking a blank down to one set of jaws the fingers on the other side are rising to get another blank for the jaws on that side.

The invention is illustrated in connection with a machine having two rotary spindles that may both have threading tools or both have pointing tools, or one a threading and the other a pointing tool as desired.

Figure 1 is of the drawings shows a plan of the machine. Fig. 2 shows a side elevation. Fig. 3 shows a front elevation. Fig. 4 shows a rear elevation. Fig. 5 shows a plan of the carrier that moves transversely across the front of the machine, at the end of the feed chute. Fig. 6 shows an elevation of one side of the same. Fig. 7 shows an elevation of the other side. Fig. 8 shows a plan of the carrier slide and oscillating blank holders. Fig. 9 shows a side view of the same. Fig. 10 shows a front view of the same. Fig. 11 shows a plan of the cam for oscillating the blank holders as they are carried back and forth by the slide. Fig. 12 shows a section of the cam on the dotted line 12—12 on Fig. 11. Fig. 13 shows a section of the cam on the dotted line 13—13 on Fig. 11. Fig. 14 shows a front elevation of one of the transporting mechanisms which pick the blanks up from the carrier and transfer them to the holding jaws. Fig. 15 shows a side elevation of the same. Fig. 16 shows a plan. Fig. 17 is a diagrammatic view illustrating the path of the blanks from the carrier to the holding jaws. Fig. 18 shows a vertical section of the holding jaw operating mechanism. Fig. 19 shows a horizontal section through the holding jaws. Fig. 20 shows a side elevation of one of the tool spindles and spindle operating mechanism. Fig. 21 shows a plan of one of the spindles.

In the machine shown the bolt blanks are thrown indiscriminately into the hopper 1 which is supported by standards 2 mounted on the top of the bed 3 (Figs. 2 and 4). The blanks are picked up from the promiscuous mass in the hopper and passed to the inclined feed chute 4 by ordinary feed mechanism consisting, in the machine shown, of the elevating plates 5 which are raised and lowered in the hopper by the lever 6 that is oscillated by the arm 7, connecting rod 8 and crank 9 in a common manner (Figs. 1, 2 and 4.)

The blanks hanging by their heads slide down the feed chute and at the lower end are received by the carrier which takes one to one side and the next to the other side, turning them from an inclined position to a horizontal position during the outward movement. The carrier consists of a slide 10 that is mounted to move from side to side across the lower end of the feed chute in a bracket 11 that is fastened to the front of the machine. The slide, in the machine shown, is reciprocated by the oscillation of a lever 12 that is swung back and forth by an arm 13 on an arbor 14 (Figs. 5, 6 and 7). On the front end of the arbor 14 is an arm 15 that is yieldingly connected by a rod 16 and spring 17 with a yoke 18 which is raised at the proper time by the engagement of the roll 19 which it carries with the cam 20 on the cam shaft 21. A spring 22 holds the yoke down with its roll bearing against the face of the cam (Figs. 2 and 3).

The carrier supports an arbor 23 on which are the blank holders 24 and 25. These blank holders are pivotally mounted on the arbor in such manner that while they are carried back and forth with the slide they are free to oscillate on the shaft independently of each other (Figs. 8 and 9). The holders are located on the slide in such relation that when one is in position to receive a blank from the lower end of the feed trough the other is out at one side in position to allow the transporting mechanism to pick up a blank from it. Fixed to the bracket 11 below the slide is a block 26 with a cam groove 27 and extending downwardly from each blank holder into this cam groove is a stud 28. The cam groove is so cut that when the slide is in one position the blank holder 24 will be inclined and the blank holder 25 horizontal (Figs. 8 and 9), and when the slide is in its other position the relative positions of the blank holders will be reversed, that is, the holder 25 will be inclined and the holder 24 horizontal. The cam, as the slide is moved back and forth by its reciprocating mechanism, oscillates the blank holders so that they will stand on an incline at the end of the feed chute for receiving the blanks and will lie horizontal when out at the side in position for the transporting fingers to pick up the blanks therefrom.

The two transporting mechanisms, which take the blanks from the ends of the transverse carrier and present them to the holding jaws in line with the tools, are duplicates. Each has a pair of spring fingers 29 attached to a bar 30 that is fastened to a swinging arm 31. This arm is near its middle pivotally mounted on an arm 32 that is fixed on a shaft 33. At its upper end the arm 31 is connected by a link 34 with a rocker plate 35 that is loosely mounted on the shaft 33. The shaft 33 is rocked by an arm 36 which by a link 37 is connected with an angle lever 38 that is oscillated by a cam 39 on the cam shaft 21. The arm 36 is drawn down so that the angle lever roll will be held in engagement with the cam by a spring 40. The rocker plate 35 is normally drawn forward by a spring 41 that is connected between the rocker plate and the arm 32. The shaft 33 is borne by a bracket 42 that is mounted on the frame. This bracket has projecting upwardly from it a cam plate 43 and on the link 34 is a roll 44 that at certain periods of movement of the parts is adapted to engage this cam plate (Fig. 14). When the arm 36 is swung up and the arm 32 is carried up thereby, as long as the roll 44 is in contact with the cam plate 43, the link 34 guides the upper end of the arm 31 in such manner that the fingers travel in a straight line. As soon, however, as the roll 44 reaches the end of the cam 43 the spring 41 has an opportunity to draw over the rocker plate 35 until the stop screw 45 engages the stud 46 upon which the roll is mounted, and then the parts oscillate as one piece and consequently the fingers are swung on the arc of a circle (Fig. 14). The return movement of the fingers is, of course, the reverse. The cam 39 is so shaped that the fingers are swung down on the arc of a circle a short distance and grasp a blank in the carrier that has been brought out to one side. The fingers then rise on the arc of a circle until the carrier is moved out of the way, after which the fingers with the blank swing down on the arc of a circle until the roll 44 engages the cam 43. Then as the cam is cut to produce a parallel motion the fingers move down in approximately a straight line and carry the blank between the holding jaws. The path of the blank, from the transverse carrier to the holding jaws, is illustrated by the dotted line 47 on Fig. 17.

The blank holding mechanisms are duplicates. The inner jaw 48 of each set is secured in a fixed position to a part of the frame, while the outer jaw 49 of each set is movably mounted in a portion of the frame. The movable jaw is attached to a horizontally movable slide 50 that is drawn out by a spring 51 (Fig. 19). For moving the jaw in and causing it to grasp a blank at the proper time a toggle link 52 is arranged between the horizontal slide 50 and a vertically movable slide 53 which is forced upwardly by a strong spring 54 and a plunger 55. This plunger is raised and lowered at the proper time by a rocker 56 that is oscillated by a cam 57 on the cam shaft 21 (Fig. 18). Springs 58 tend to hold the rocker with its roll 59 in contact with the periphery of the cam. When the cam swings the rocker and lifts the plunger the movable jaw is closed by the toggle link. The spring 54 between the vertical slide and the plunger is of sufficient strength to cause the jaws to securely hold whatever they are intended to grasp, but should the blank become misplaced or any accident occur, the spring 54 will yield to such an extent that the parts will not become broken.

The center of each set of jaws, when closed, is in line with the axis of a rotating spindle 60. In the head 61 of each spindle are the cutting tools, either threading, pointing, or of such other form as will make the required cut. This spindle has a pinion 62 which meshes with a gear 63 fixed to an arbor 64 on which is a gear 65. The gear 65 engages with a gear 66 on an arbor 67 that has a bevel gear 68 in engagement with a bevel gear 69 on the shaft 70. The shaft 70 carries the driving pulley 71. On the arbor 67 back of the gear 66 is a pinion 72 which meshes with a gear 73 that has a pinion 74 in mesh with a gear 75 fixed on the cam shaft 21 (Fig. 20). Each rotating spindle is moved forwardly in its bearings to carry the cutting tools up to the stock held in the jaws, by a lever 76 which is oscillated by a cam 77 on the cam shaft. The lever 76 is forked at its upper end and it engages a collar 78 which thrusts against a spring 79 that is on a sleeve 89 fixed to the spindle. By this means the spindle is moved forwardly and yet, should the blank be misplaced or any accident occur, the spring 79 will yield so that the cutting tools will not be broken. If the machine is to be used for threading it is necessary to open the threading dies after the thread has been cut in order to permit the retraction of the spindle. To provide for this a cam 80 is placed on the cam shaft in such manner as to oscillate an angle lever 81 which lifts and lowers the slide 82. This slide has a cross head 83 which engages the tail of a lever 84 that is designed to rock the fork 85 which opens and closes the cutting tools in a common way (Figs. 20 and 21). If it is desired to put one of the spindles out of action the pin 86 may be withdrawn so as to free the bushing 87 which holds the hub 88 of the pinion 62. When this pin is removed the bushing with the pinion may be slipped rearwardly out of mesh with the gear 63 and thus without disturbing any of the other mechanisms the spindle will be disconnected so that it will not rotate.

The invention claimed is;

1. The combination with the blank hopper and tool spindles of a metal turning machine, of a feed chute leading from the hopper, a carrier movable across the end of the chute, mechanism for moving the carrier, blank holding jaws in line with the spindles, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

2. The combination with the blank hopper and tool spindles of a metal turning machine, of a feed chute leading from the hopper, a carrier movable transversely across the chute mechanism for reciprocating the carrier, blank holding jaws in line with the spindles, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

3. The combination with the blank hopper and tool spindles of a metal turning machine, of a feed chute leading from the hopper, mechanism for picking blanks from the hopper and placing them in the chute, a carrier movable across the end of the chute, mechanism for moving the carrier, blank holding jaws in line with the spindles, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

4. The combination with the blank hopper and tool spindles of a metal turning machine, of a feed chute leading from the hopper, mechanism for picking blanks from the hopper and placing them in the chute, a carrier movable transversely across the chute, mechanism for reciprocating the carrier, blank holding jaws in line with the spindles, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

5. The combination with the blank hopper and tool spindles of a metal turning machine, of a feed chute leading from the hopper, a carrier movable across the end of the chute, blank holders independently movable on the carrier and adapted to register with the end of the chute, mechanism for moving the carrier and holders, blank holding jaws in line with the spindles, fingers movable from the outer positions of the blank holders to the jaws, and mechanism for alternately moving the fingers toward the blank holders and then to the jaws for picking blanks first from one holder and then the other holder and placing them in the jaws in line with the spindles.

6. The combination with the blank hopper and tool spindles of a metal turning machine, of a feed chute leading from the hopper, a carrier movable transversely across the end of the chute, blank holders independently movable on the carrier and adapted to register with the end of the chute, mechanism for reciprocating the carrier and holders, blank holding jaws in line with the spindles, fingers movable from the outer positions of the blank holders to the jaws, and mechanism for alternately moving the fingers toward the blank holders and then to the jaws for picking blanks first from one holder and then the other holder and placing them in the jaws in line with the spindles.

7. The combination with the blank hopper and tool spindles of a metal turning machine, of a feed chute leading from the hopper, a carrier movable across the end of the chute, blank holders movable sidewise with the carrier but having an independent oscillation thereon, mechanism for moving the carrier, means for oscillating the holders as they move with the carrier, blank holding jaws in line with the spindles, fingers movable from the outer positions of the holders to the jaws, and mechanism for alternately moving the fingers toward the holders and then to the jaws for picking blanks first from one holder and then the other holder and placing them in the jaws in line with spindles.

8. The combination with the blank hopper and tool spindles of a metal turning machine, of a feed chute leading from the hopper, a carrier movable transversely across the chute, blank holders movable sidewise with the carrier but having an independent oscillation thereon, mechanism for reciprocating the carrier, means for oscillating the holders as they move sidewise with the carrier, blank holding jaws in line with the spindles, fingers movable from the outer positions of the holders to the jaws, and mechanism for alternately moving the fingers toward the holders and then to the jaws for picking blanks first from one holder and then the other holder and placing them in the jaws in line with the spindles.

9. The combination with the blank hopper and tool spindles of a metal turning machine, of a feed chute leading from the hopper, a slide movable across the chute, two blank holders independently mounted on the slide, mechanism for reciprocating the slide, means for oscillating the holders as they move back and forth with the slide, blank holding jaws in line with the spindles, fingers movable from the outer positions of the holders to the jaws, and mechanism for alternately moving the fingers toward the holders and then to the jaws for picking blanks first from one holder and then the other holder and placing them in the jaws in line with the spindles.

10. The combination with the blank hopper and tool spindles of a metal turning machine, of a feed chute leading from the hopper, a slide movable across the end of the chute, two blank holders independently mounted on the slide, mechanism for moving the slide, means for oscillating the holders as they move with the slide, blank holding jaws in line with the spindles, fingers movable from the outer positions of the holders to the jaws, and mechanism for alternately moving the fingers toward the holders and then to the jaws for picking blanks first from one holder and then the other holder and placing them in the jaws in line with the spindles.

11. The combination with the blank hopper and tool spindles of a metal turning machine, of a feed chute leading from the hopper, a carrier movable transversely across the chute, mechanism for reciprocating the carrier, blank holding jaws in line with the spindles, means for opening and closing the jaws, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

12. The combination with the blank hopper and tool spindles of a metal turning machine, of a feed chute leading from the hopper, a carrier movable across the end of the chute, mechanism for moving the carrier, blank holding jaws in line with the spindles, means for opening and closing the jaws, fingers movable from the ends of the carrier to the jaws, and mechanism for alternately moving the fingers toward the ends of the carrier and then to the jaws for picking blanks alternately from opposite ends of the carrier and placing them in the jaws in line with the spindles.

13. The combination with the blank hopper and tool spindles of a metal turning machine, of a feed chute leading from the hopper, a carrier movable transversely across the chute, mechanism for reciprocating the carrier, blank holding jaws in line with the spindles, oscillatory and reciprocatory fingers, and mechanism for oscillating and reciprocating the fingers alternately toward the ends of the carrier and then to the jaws for picking blanks alternately from opposite ends of the carrier and placing them in the jaws in line with the spindles.

14. The combination with the blank hopper and tool spindles of a metal turning machine, of a feed chute leading from the hopper, a carrier movable across the end of the chute, mechanism for moving the carrier, blank holding jaws in line with the spindles, oscillatory and reciprocatory fingers, and mechanism for oscillating and reciprocating the fingers alternately toward the ends of the carrier and then to the jaws for picking blanks alternately from opposite ends of the carrier and placing them in the jaws in line with the spindles.

15. A feed mechanism for a blank turning machine having a feed chute, a carrier movable transversely across the chute, mechanism for reciprocating the carrier, a blank holder movably mounted on the carrier near each end, fingers movable toward and from opposite ends of the carrier, and mechanism for moving the fingers alternately toward and from the ends of the carrier.

16. A feed mechanism for a blank turning machine having a feed chute, a carrier movable across the end of the chute, mechanism for moving the carrier, a blank holder movably mounted on the carrier near each end, fingers movable toward and from opposite ends of the carrier, and mechanism for moving the fingers alternately toward and from the ends of the carrier.

17. A carrier for an automatic blank feed mechanism comprising a slide, and two blank holders independently movable on and movable back and forth with the slide.

18. A carrier for an automatic blank feed mechanism comprising a slide, and blank holders mounted to move back and forth with the slide and to oscillate independently of each other thereon.

19. The combination in an automatic blank feed mechanism, of a slide, mechanism for moving the slide, blank holders pivotally mounted on the slide, and means for swinging the blank holders as they are carried by the slide.

20. The combination in an automatic blank feed mechanism, of a slide, mechanism for reciprocating the slide, blank holders pivotally mounted on the slide, and means for oscillating the blank holders as they are carried back and forth by the slide.

21. The combination in a blank feed mechanism, of an oscillatory arm, a swinging arm, carried thereby, fingers carried by said swinging arm, a rocker plate, a link connecting said rocker plate with the end of the swinging arm, a spring connecting said oscillatory arm with said rocker plate, means for oscillating the oscillatory arm, a stop on said oscillatory arm adapted to engage a stop on said link, and a cam plate adapted to engage a part on the link and oscillate the link independently of the oscillatory arm, whereby said fingers during a portion of their travel move in a curved path and during another portion of their travel move in a straight path.

22. The combination in a blank feed mechanism, of an oscillatory arm, means for oscillating said arm, fingers carried by said oscillatory arm, and means for swinging said fingers independently of said arm, whereby said fingers are carried during a portion of their travel in a curved path and during another portion of their travel in a straight path.

23. The combination in a metal turning machine, of a feed chute, a carrier movable across the end of the chute, mechanism for moving the carrier back and forth, a fixed gripping jaw, a movable gripping jaw, a horizontally movable slide carrying the movable jaw, a vertical slide, a toggle link operated by the vertical slide for moving the horizontal slide, a plunger, means for reciprocating the plunger, a spring between the plunger and the vertical slide, and fingers adapted to move from the end of the carrier to the jaws.

24. The combination in a metal turning machine, of a blank carrier, mechanism for moving the carrier back and forth, a fixed gripping jaw, a movable gripping jaw, a horizontally movable slide carrying the movable jaw, a vertical slide, a toggle link operated by the vertical slide for moving the horizontal slide, a plunger, means for reciprocating the plunger, a spring between the plunger and the vertical slide, and fingers adapted to move from the end of the carrier to the jaws.

25. The combination in a blank feed mechanism, of a feed chute, a carrier movable transversely across the end of the chute, mechanism for reciprocating the carrier, two blank holders independently pivoted on the carrier, a fixed cam for oscillating the holders, transfer fingers movable toward and from the ends of the carrier and down past the carrier, and mechanism for oscillating and reciprocating the fingers.

26. The combination in a blank feed mechanism, of a blank carrier, mechanism for reciprocating the carrier, two blank holders independently pivoted on the carrier, a fixed cam for oscillating the holders, transfer fingers movable toward and from the ends of the carrier and down past the carrier, and mechanism for oscillating and reciprocating the fingers.

27. The combination in a machine for turning metal blanks, of a pair of rotatory tool spindles, means for rotating the spindles, a pair of gripping jaws in line with each of the spindles, means for opening and closing the jaws, a feed chute, a carrier movable transversely across the end of the chute, mechanism for reciprocating the carrier, two sets of gripping fingers, and mechanism for moving the fingers on one side toward one end of the transversely movable carrier and then to the jaws on that side, and mechanism for moving the other set of fingers toward the other end of the carrier and then to the jaws on the other side.

28. The combination in a machine for turning metal blanks, of a pair of rotatory tool spindles, means for rotating the spindles, a pair of gripping jaws in line with each of the spindles, a feed chute, a carrier movable transversely across the end of the chute, mechanism for reciprocating the carrier, two sets of gripping fingers, and mechanism for moving the fingers on one side toward one end of the transversely movable carrier and then to the jaws on that side, and mechanism for moving the other set of fingers toward the other end of the carrier and then to the jaws on the other side.

CHARLES T. BRENNAN.
HENRY L. SMITH.